(No Model.)

J. S. DE PALOS.
PRESSURE REGULATOR.

No. 346,403. Patented July 27, 1886.

Witnesses.
Howard J. Schneider
W. R. Haight

Inventor.
James S. de Palos
By W. H. Babcock
Attorney.

UNITED STATES PATENT OFFICE.

JAMES S. DE PALOS, OF NEW YORK, N. Y.

PRESSURE-REGULATOR.

SPECIFICATION forming part of Letters Patent No. 346,403, dated July 27, 1886.

Application filed December 24, 1885. Serial No. 186,604. (No model.)

*To all whom it may concern:*

Be it known that I, JAMES S. DE PALOS, a citizen of the United States, residing at New York, in the county of New York and State of New York, have invented certain new and useful Improvements in Pressure-Regulators for Gas-Meters; and I do hereby declare the following to be a full, clear, and exact description of the invention, such as will enable others skilled in the art to which it appertains to make and use the same.

My said improvements are more especially designed to be applied to what are known as "wet-meters."

It is well known that wet-meters, as ordinarily constructed, although preferable to dry-meters in many respects, cannot be used in locations where there are very high pressures of gas in the street mains, or pressures exceeding, say, three inches, for the reason that under such high pressures the gas is liable to be blown out from under the sealing-compartments of the measuring-drum; and the object of the first of my said improvements is to obviate this difficulty and to adapt a wet-meter to be used, whatever the pressure in the street-mains may be; and the object of the second of my said improvements is to provide means whereby the consumer may at any time readily ascertain by inspection, not only the quantity of gas consumed within a given period, but also the money-value of the gas consumed during such period, at the price charged for the same, without reference to any prior registry and without calculation.

The invention consists, chiefly, in a gas-meter provided with a governor or regulator connected with its measuring-drum, and constructed and arranged, as hereinafter particularly described, whereby the pressure on the gas is regulated before it enters the meter.

Figure 1:
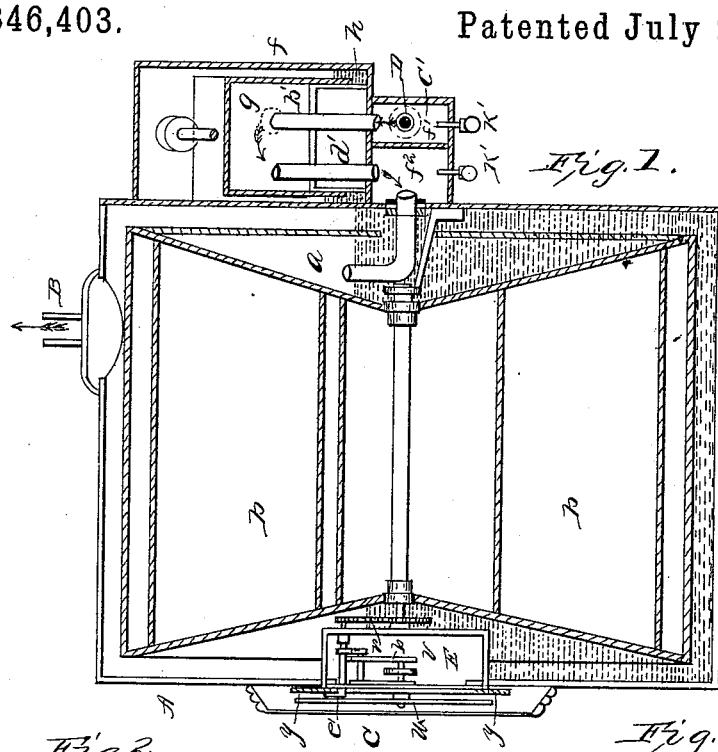
Figure 2:
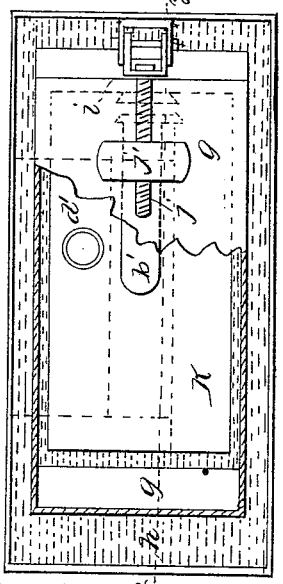
Figure 3:
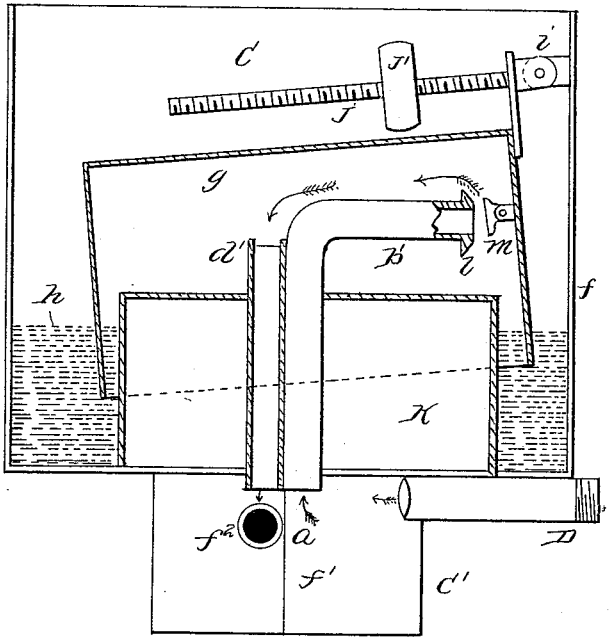

In the accompanying drawings, on Sheet No. 1, Figure 1 is a vertical longitudinal central section of a meter with my governor attached. Fig. 2 is a plan view of the governor; and Fig. 3 is a vertical section of the governor, taken on the line *z z* in Fig. 2. Figs. 2 and 3 are drawn on an enlarged scale.

Similar letters of reference indicate like parts in all the several figures.

A represents a gas-meter, of the kind known as a "wet-meter," being filled with a sealing-fluid below the level of the gas-inlet *a*, and *b* is its measuring-drum, which is of ordinary construction.

*c* is an indicator or gage, of the usual form, attached to the front of the meter, so as to connect with its interior, for the purpose of showing the level of the fluid in the meter. A plug (hidden from view by the body of the governor) is provided at the rear end of the meter for adding to the sealing-fluid when necessary, so as to keep it at the proper level.

*e'* indicates the ordinary indexes for showing the quantity of the gas that has passed through the meter.

B is the outlet-pipe, which takes the gas from the meter and delivers it to the burners.

C is my improved governor or regulator, for moderating the pressure on the gas before the latter enters the meter. This governor is constructed as follows, namely: *f* is an outer shell or box, which is attached to the rear end of the meter, and has provision at or near its top to admit atmospheric air. *g* is a float of sheet metal or other suitable material, the four sides and top of which are made air-tight, its under side being open and immersed in a sealing-fluid, *h*. This float is hinged at one of its upper edges to the shell *f*, as shown by *i*, and attached to said hinge *i* is a screw-threaded rod, *j*, upon which is fitted a weight *j'*, to move back and forth upon the same. A hollow box or drum, *k*, is secured to the bottom plate of the shell or box *f*, the purpose of which is to take up part of the space occupied by the sealing-fluid, and thereby reduce the quantity of the same.

D is the main inlet-pipe, which takes the gas from the mains and supplies it to the governor, and from thence, after it has been moderated to the proper pressure, it is conducted to the meter by the pipe *a*. This pipe D is passed into and terminates in one compartment *f'* of a box, C', attached to the under side of the shell *f* to receive the incoming gas, and a pipe, *b'*, enters said compartment through its top cover and through the bottom of the shell *f*. At the upper end of this pipe *b'*, which passes through the box *k*, is a valve seat, *l*, which forms the seat of a valve-plate, *m*, which latter is hinged, as shown, to the inside of the float *g* in such position that the valve is closed by the rising of the float, and opened by its descent, thereby diminishing the quantity admitted when the pressure increases, and increasing the quantity admitted when the pressure diminishes. After having passed through the valve $l\ m$, the gas is conducted downward through a pipe, $d'$, into a separate compartment, $f^2$, of the box C', and from thence into the inlet-pipe $a$. It is immaterial whether the box C' is divided by a transverse or longitudinal partition, so long as the two compartments $f'\ f^2$ are separate and effectually isolated from each other. The pressure at which it is desired that the gas shall enter the meter is regulated at pleasure by moving the weight $j'$ toward the end of the rod $j$ to increase the same and moving it toward the hinge $i$ to reduce the pressure. By these means the gas is regulated to the desired pressure before it enters the meter and the difficulties heretofore encountered in the use of a wet-meter under high street-pressures are entirely removed.

Drip-cups represented by $k'\ k'$ are provided for the removal of any condensation fluids.

Referring to Fig. 1, E is a cylindrical case, having its rear end closed, which is fitted or attached to the front end of the meter concentric therewith, and forms a cylindric recess. This case contains the registering mechanism, and has on its face a dial, over which an index-finger passes. Said mechanism need not be more fully described here, as it forms the subject of a separate application No. 177,347, filed September 17, 1885.

The pivoted attachment of the valve-plate insures the accurate closing of the pipe $b'$ when the float fully descends.

I am aware that it is not new to provide a gas-regulator with a pivoted float, and a knob or block rigidly attached thereto, a pipe discharging gas against said knob or block and arranged to be closed by the latter when the float descends, a case containing liquid in which said float rises and falls, and a pipe which conveys the gas from within said float after the gas has passed said knob or block, and I therefore do not claim such construction; but,

Having thus described my invention, what I claim, and desire to secure by Letters Patent, is—

In a gas-regulator, the combination of a pivoted float, a valve-plate pivoted to said float, a pipe discharging gas against said valve-plate, and arranged to be closed by the latter when the float descends, a case containing liquid in which said float rises and falls, and a pipe which conveys the gas from within said float after the gas has passed said valve-plate, substantially as set forth.

In testimony whereof I affix my signature in presence of two witnesses.

JAMES S. DE PALOS.

Witnesses:
 FERNANDO G. GARDNER,
 WM. H. DRAKE.